(12) United States Patent
Yoshizawa

(10) Patent No.: US 9,113,104 B2
(45) Date of Patent: Aug. 18, 2015

(54) IMAGE PROCESSING APPARATUS AND IMAGE PROCESSING METHOD TO PERFORM SCREEN PROCESSING FOR IMAGE DATA

(75) Inventor: Masanori Yoshizawa, Hachioji (JP)

(73) Assignee: KONICA MINOLTA, INC. (JP)

( * ) Notice: Subject to any disclaimer, the term of this patent is extended or adjusted under 35 U.S.C. 154(b) by 1131 days.

(21) Appl. No.: 12/720,036

(22) Filed: Mar. 9, 2010

(65) Prior Publication Data

US 2010/0238510 A1 Sep. 23, 2010

(30) Foreign Application Priority Data

Mar. 23, 2009 (JP) .................................. 2009-069773

(51) Int. Cl.
*H04N 1/405* (2006.01)
*H04N 1/40* (2006.01)
*H04N 1/52* (2006.01)

(52) U.S. Cl.
CPC ....... *H04N 1/40087* (2013.01); *H04N 1/40025* (2013.01); *H04N 1/52* (2013.01)

(58) Field of Classification Search
CPC ................................................ H04N 1/40025
See application file for complete search history.

(56) References Cited

U.S. PATENT DOCUMENTS

| 7,130,084 B2 | 10/2006 | Fujita ............................ 358/3.06 |
| 2002/0186414 A1* | 12/2002 | Crossland et al. ........... 358/3.06 |
| 2006/0170986 A1 | 8/2006 | Iriyama ......................... 358/474 |
| 2006/0209346 A1 | 9/2006 | Nakahara ..................... 358/3.06 |
| 2006/0285167 A1* | 12/2006 | Washio ......................... 358/3.14 |
| 2007/0211913 A1 | 9/2007 | Washio .......................... 382/100 |

FOREIGN PATENT DOCUMENTS

| EP | 0 234 809 A2 | 9/1987 |
| EP | 1 734 737 A1 | 12/2006 |
| JP | 05-063981 A | 3/1993 |
| JP | 09-093444 A | 4/1997 |
| JP | 2000-343748 A | 12/2000 |

(Continued)

OTHER PUBLICATIONS

Japanese Decision of Refusal dated Mar. 1, 2011, for counterpart Japanese Application No. 2009-069773, together with an English translation thereof.

(Continued)

*Primary Examiner* — Barbara Reinier
*Assistant Examiner* — Christopher D Wait
(74) *Attorney, Agent, or Firm* — Cantor Colburn LLP

(57) ABSTRACT

Disclosed is an image processing apparatus to perform screen processing for image data, and to form an image based thereon, comprising a screen processing unit to perform the screen processing by using a subcell corresponding to a plurality of pixels, and in which a first and a second threshold values are determined according to each position of the pixels, wherein the screen processing unit obtains threshold values, to output either an invariable value $D_{min}$, an invariable value $D_{Max}$, or an interpolated value of the two invariable values, and wherein the subcell is determined so that the first threshold value of a given pixel is larger than the first threshold value of a prior pixel and is smaller than the second threshold value thereof, the threshold values of the prior pixel being determined so that a dot is formed in the prior pixel earlier than in the given pixel.

10 Claims, 15 Drawing Sheets

(56) References Cited

FOREIGN PATENT DOCUMENTS

| | | |
|---|---|---|
| JP | 2002-232711 A | 8/2002 |
| JP | 4023095 B2 | 10/2007 |

OTHER PUBLICATIONS

Daniel L. Lau et al, "Modern Digital Halftoning", CRC Press, pp. covers, xii-xvi, 1, 34, and 35.

Japanese Notification of Reasons for Refusal dated Nov. 30, 2010, for counterpart Japanese Application No. 2009-069773, together with an English translation thereof.

Notification of the First Office Action for Chinese Patent Application No. 201010145573.5, issued Mar. 22, 2012, with English translation.

Extended European Search Report dated Oct. 4, 2010, for counterpart European Application No. 10155123.2.

* cited by examiner

|  |  |  |  |
|---|---|---|---|
| 15 | 8 | 12 | 16 |
| 11 | 4 | 1 | 5 |
| 7 | 3 | 2 | 9 |
| 14 | 10 | 6 | 13 |

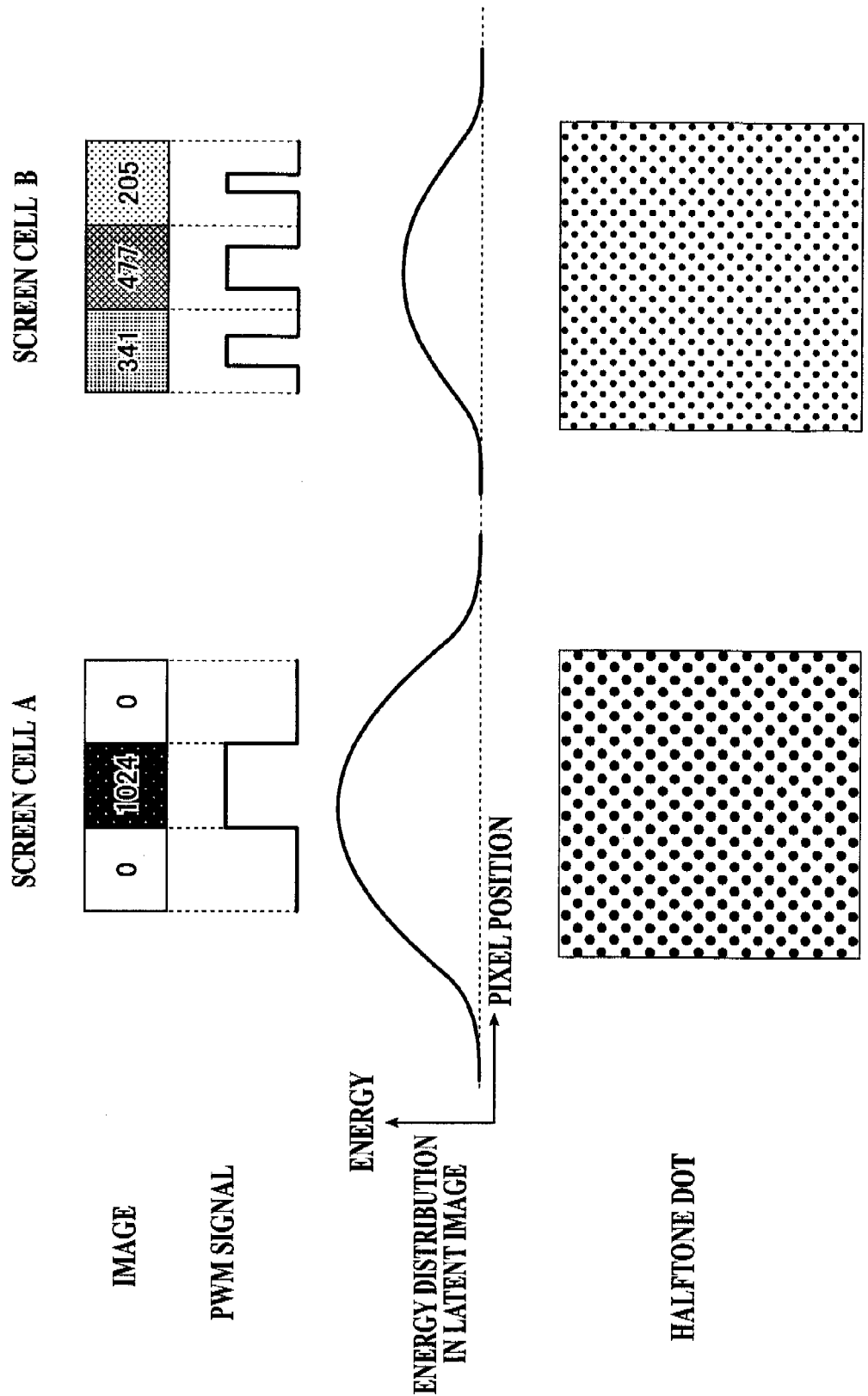

| | C1 | | | C | | C2 | |
|---|---|---|---|---|---|---|---|
| 57 | 29 | 45 | 61 | 58 | 30 | 46 | 62 |
| 41 | 13 | 1 | 17 | 42 | 14 | 2 | 18 |
| 25 | 9 | 5 | 33 | 26 | 10 | 6 | 34 |
| 53 | 37 | 21 | 49 | 54 | 38 | 22 | 50 |
| 60 | 32 | 48 | 64 | 59 | 31 | 47 | 63 |
| 44 | 16 | 4 | 20 | 43 | 15 | 3 | 19 |
| 28 | 12 | 8 | 36 | 27 | 11 | 7 | 35 |
| 56 | 40 | 24 | 52 | 55 | 39 | 23 | 51 |

C4     C3

IMAGE PROCESSING APPARATUS AND IMAGE PROCESSING METHOD TO PERFORM SCREEN PROCESSING FOR IMAGE DATA

BACKGROUND OF THE INVENTION

1. Field of the Invention

The present invention relates to an image processing apparatus and an image processing method.

2. Description of Related Art

An electrophotographic method is a printing method, in which a laser light is irradiated on a photoconductor to form an electrostatic latent image, and a toner image formed on the photoconductor by development processing is transferred onto a sheet. A pulse width modulation (PWM) of the laser light is controlled according to a pixel value of an image to be formed, so that an irradiation range of the laser light is changed.

A multivalued dither method has been used as a reproduction method of a gradation when performing the printing by the electrophotographic method (see for example, Japanese Patent No. 4023095; and a non-patent document: Daniel L. Lau and Gonzalo R. Arce, "Modern Digital Halftoning"). The multivalued dither method is a method to convert an input pixel value of an image to an output pixel value of a plurality of levels, that is to say, to a multivalued output pixel value. For example, subcells are used in each of which two threshold values T1, T2 (wherein T1<T2) are set according to a position of pixels, so that the threshold values T1, T2 corresponding to the position of each pixel in the image are obtained by the subcells. Next, two threshold values T1, T2 and a pixel value are compared, so that the pixel value is converted to an invariable value $D_{min}$ when the pixel value is smaller than the threshold value T1, and the pixel value is converted to an invariable value $D_{Max}$ when the pixel value is larger than the threshold value T2. Further, the pixel value is converted to an interpolated value between the invariable values $D_{min}$ and $D_{Max}$, when the pixel value is in the range of equal to or more than the threshold value T1, and equal to or less than the threshold value T2.

The resolution of an image has been advanced in recent years, thus there may be cases in which a beam spot diameter of the laser light happens to exceed the controllable size of one pixel. For example, as shown in FIG. 14, the size of one side of one pixel in a high resolution 1200 dpi is approximately 21 μm, whereas the beam spot diameter of the laser light is larger, which is approximately 60 μm. The circles drawn in a broken line in FIG. 14 respectively indicate the irradiation range of the laser light. As shown in FIG. 14, the beam spot diameter has the size covering a plurality of pixels, thereby the laser light irradiated to a focused pixel also happens to irradiate the pixels surrounding the focused pixel, which results in generating a dot gain.

FIG. 15 is a diagram describing the dot gain.

As shown in FIG. 15, in a case of an image in which the pixel value of the focused pixel has the maximum value of 255, and the pixel value of the surrounding pixels has the minimum value of 0, the laser light is emitted with the maximum output to the focused pixel having the maximum value of 255. When the light is emitted with the maximum output, the latent image formed by the laser light is to have an energy distribution with a broad base, thereby the size of each dot which forms the latent image is to be extended. As a result, although an exposure is performed for one pixel, a large dot which covers the plurality of pixels is formed, to generate an exceeded dot gain. Since the beam spot diameter exceeds the controllable size of one pixel, the dot gain is generated in the same manner also in the case where the pixel value of the focused pixel is a halftone of 128, thereby a dot exceeding the size of one pixel is formed, as shown in FIG. 15.

Such a dot gain invites a gradation collapse. This is because even when the pixel value of the focused pixel is a halftone, in a case where the adjacent pixels are of approximately the maximum value, the focused pixel is exposed when the adjacent pixels are exposed, thereby the adjacent pixels reach the maximum value.

As such, the reproduction property of the gradation in the original image has been reduced due to the generation of the dot gain.

When the multivalued dither processing is performed by a method in which a plurality of the subcells in combination, which is referred to as a supercell, are used in order to realize a further multiple gradation as shown in the Japanese Patent No. 4023095, the granularity may be reduced due to the dot gain and the gradation collapse. The pixel which is allotted with a small threshold value among the supercell is likely to reach the maximum value, thereby the dot gain is generated, so that a large halftone dot is to be formed in the subcell including such a pixel. On the other hand, in the pixel which is allotted with a large threshold value, the pixel value of the minimum value or the halftone is output, thereby the dot gain is not generated (or the dot gain is generated in a small degree, if any) in the subcell including such a pixel, so that a small halftone dot is to be formed. As such, even when the density of an image is even, the image gives the impression of having an uneven granularity due to the large and small different halftone dots being mixed therein.

The above problem may be solved when a laser light having a beam spot diameter smaller than the size of one pixel with a high resolution is used, however, such a laser light source of an enhanced performance is expensive and demands cost.

Further, even in a case where the beam spot diameter is not larger than the controllable size of one pixel, when the laser light is output with a large power such that the light amount given to one pixel is equivalent to that given to a beam spot diameter which is larger than one pixel, the same problem presumably occurs. When the power is large, the energy distribution in the latent image is to be extended accordingly, which results in the extension of the size of the dots to be formed.

SUMMARY OF THE INVENTION

The objects of the present invention include, reducing dot gains, and improving the reproduction property of gradations.

To achieve at least one of the above objects, an image processing apparatus to perform screen processing for image data, and to form an image based on the image data which has been performed with the screen processing, reflecting one aspect of the present invention, comprises a screen processing unit to perform the screen processing by using a subcell which corresponds to a plurality of pixels, and in which a first threshold value and a second threshold value are determined according to each position of the pixels, so as to satisfy a relationship of the first threshold value<the second threshold value, wherein the screen processing unit obtains the first threshold value and the second threshold value from the subcell, which correspond to the position of each pixel in an image, to output: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is determined so that the first threshold value of a given pixel in the subcell is larger than the first threshold value of a prior pixel and is smaller than the second threshold value of the prior pixel, the first threshold value and the second threshold value of the prior pixel being determined so that a dot is formed in the prior pixel earlier than in the given pixel.

To achieve at least one of the above object, an image forming method in an image processing apparatus to perform screen processing for image data, and to form an image based on the image data which has been performed with the screen processing, reflecting another aspect of the present invention, comprises performing the screen processing by using a subcell which corresponds to a plurality of pixels, and in which a first threshold value and a second threshold value are determined according to each position of the pixels, so as to satisfy a relationship of the first threshold value<the second threshold value, wherein the performing of the screen processing comprises:

obtaining the first threshold value and the second threshold value from the subcell, which correspond to the position of each pixel in an image; and outputting: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is determined so that the first threshold value of a given pixel in the subcell is larger than the first threshold value of a prior pixel and is smaller than the second threshold value of the prior pixel, the first threshold value and the second threshold value of the prior pixel being determined so that a dot is formed in the prior pixel earlier than in the given pixel.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein:

FIG. 9 is a diagram showing an image obtained by the screen processing, PWM signal obtained by a conversion of an image signal thereof, an energy distribution in a latent image formed by the laser light, and halftone dots formed by an exposure of the laser light, in the case where the normal subcell is used, and in the case where another subcell is used when the beam spot diameter of the laser light exceeds the controllable size of one pixel, respectively;

DETAILED DESCRIPTION OF THE PREFERRED EMBODIMENT

The image processing apparatus according to the present invention is, for example, a printer, a copying machine, a facsimile machine, a multi-function peripheral (MFP) of these machines, or the like, but is not limited to these as long as it is an image processing apparatus to perform screen processing, and may also be a personal computer which performs the screen processing.

In the present embodiment, an image processing apparatus comprising a copying function in which an image is read from a document to be copied is given as an example. In the following, the embodiment of the present invention is described with reference to the drawings.

Figure 1:
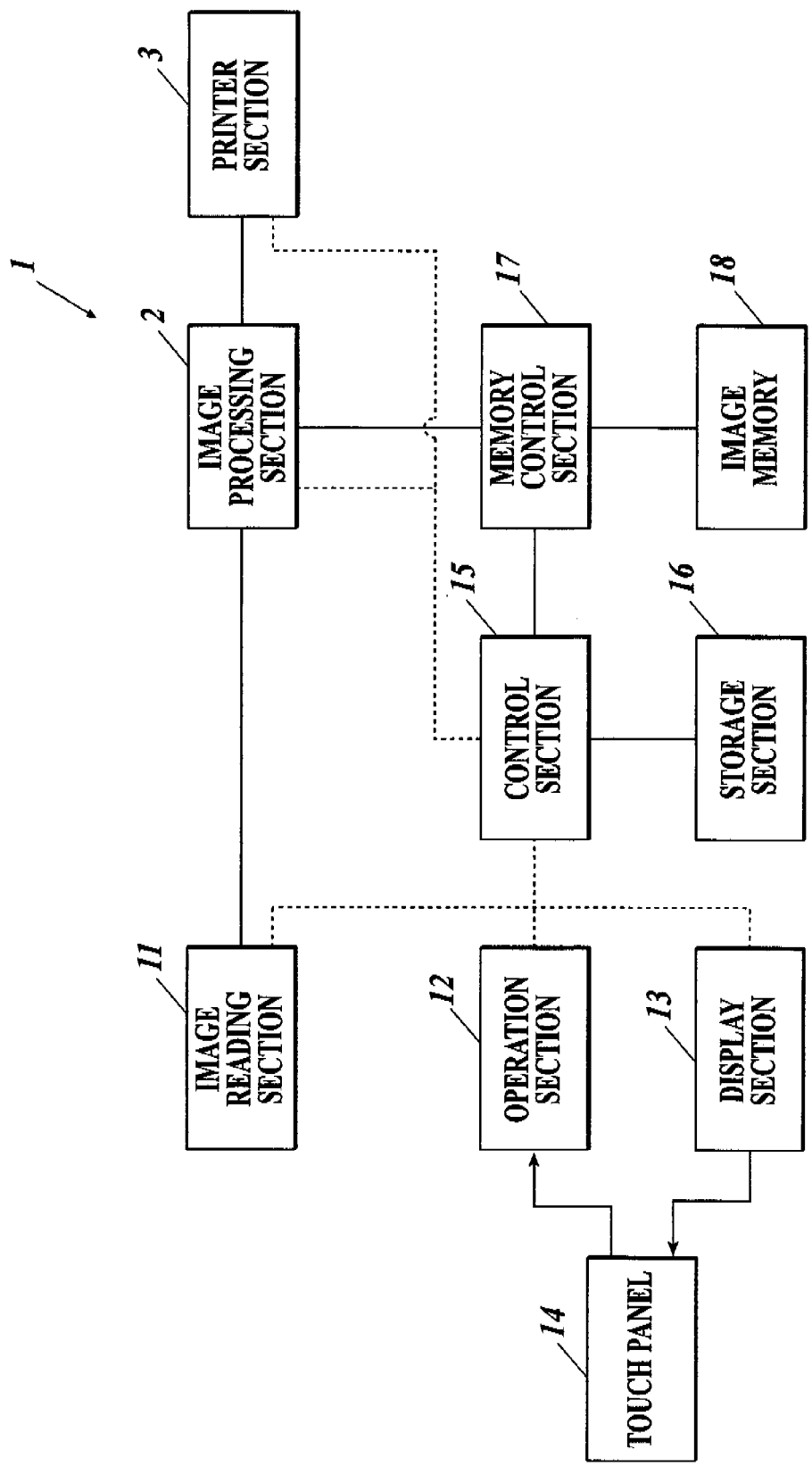
FIG. 1 is a diagram showing a functional configuration of an image processing apparatus according to the present embodiment.

FIG. 1 shows a main functional configuration of an image processing apparatus 1 in the present embodiment.

As shown in FIG. 1, the image processing apparatus 1 comprises: an image reading section 11; an operation section 12; a display section 13; a touch panel 14; a control section 15; a storage section 16; a memory control section 17; an image memory 18; an image processing section 2; and a printer section 3. The solid lines to connect each section indicate a system bus, and the broken lines indicate a serial bus, in the diagram.

The image reading section 11 comprises: a light source; an optical system; a charge coupled device (CCD); and an analog/digital (A/D) converter. The image reading section 11 forms a reflection image of a light illuminated and scanned through the document from the light source by the optical system, and performs a photoelectric conversion by the CCD, thereby reads the document image. The read image in a state of an analog signal is converted to a state of a digital signal by the A/D converter so as to be output to the image processing section 2.

The operation section 12 comprises various functional keys such as a start key to instruct the printing to be started, numeric keys, and the like. When these functional keys or the touch panel 14 is operated, the operation section 12 generates an operation signal corresponding thereto so as to output the generated operation signal to the control section 15.

The display section 13 comprises a liquid crystal display (LCD) which is integrally formed with the touch panel 14, and displays various operation screens to perform printing operations on the LCD.

The control section 15 comprises: a central processing unit (CPU); and a random access memory (RAM). The control section 15 executes various processing such as printing processing, and the like, in cooperation with programs stored in the storage section 16. In the processing, the control section 15 performs various calculations, and controls operations of each section in the image processing apparatus 1 in a centralized manner.

The storage section 16 stores the programs to be executed by the control section 15, and files and data necessary for the execution of the programs. A hard disk, for example, may be used as the storage section 16.

The memory control section 17 writes an image into the image memory 18, and reads out the image stored in the image memory 18.

The image memory 18 stores images. A dynamic random access memory (DRAM), for example, may be used as the image memory 18.

The image processing section 2 performs various image processing, such as a shading correction, a color conversion, an expansion or reduction, a resolution conversion, γ correction processing, screen processing, for an image.

An image read by the image reading section 11 is performed with necessary image processing, such as the color conversion, the resolution conversion, and the like, by the image processing section 2, and then is once saved in the image memory 18. When the printing is instructed by the control section 15, the image to be printed which is read out from the image memory 18 is input to the image processing section 2, and the image processing section 2 performs the image processing such as the screen printing, and the like, so as to output the processed image to the printer section 3.

The printer section 3 prints the image by an electrophotographic method. The printer section 3 comprises: an exposure unit; a development unit; a transfer unit; and a fixing unit. At the time of printing, the exposure unit irradiates a laser light to form an electrostatic latent image on a photoconductive drum. The development unit executes the development processing to form a toner image in which the electrostatic latent image on the photoconductive drum is visualized by toners. The transfer unit transfers the toner image on a sheet, and the fixing unit performs fixing processing for the toner image transferred onto the sheet.

Figure 2:
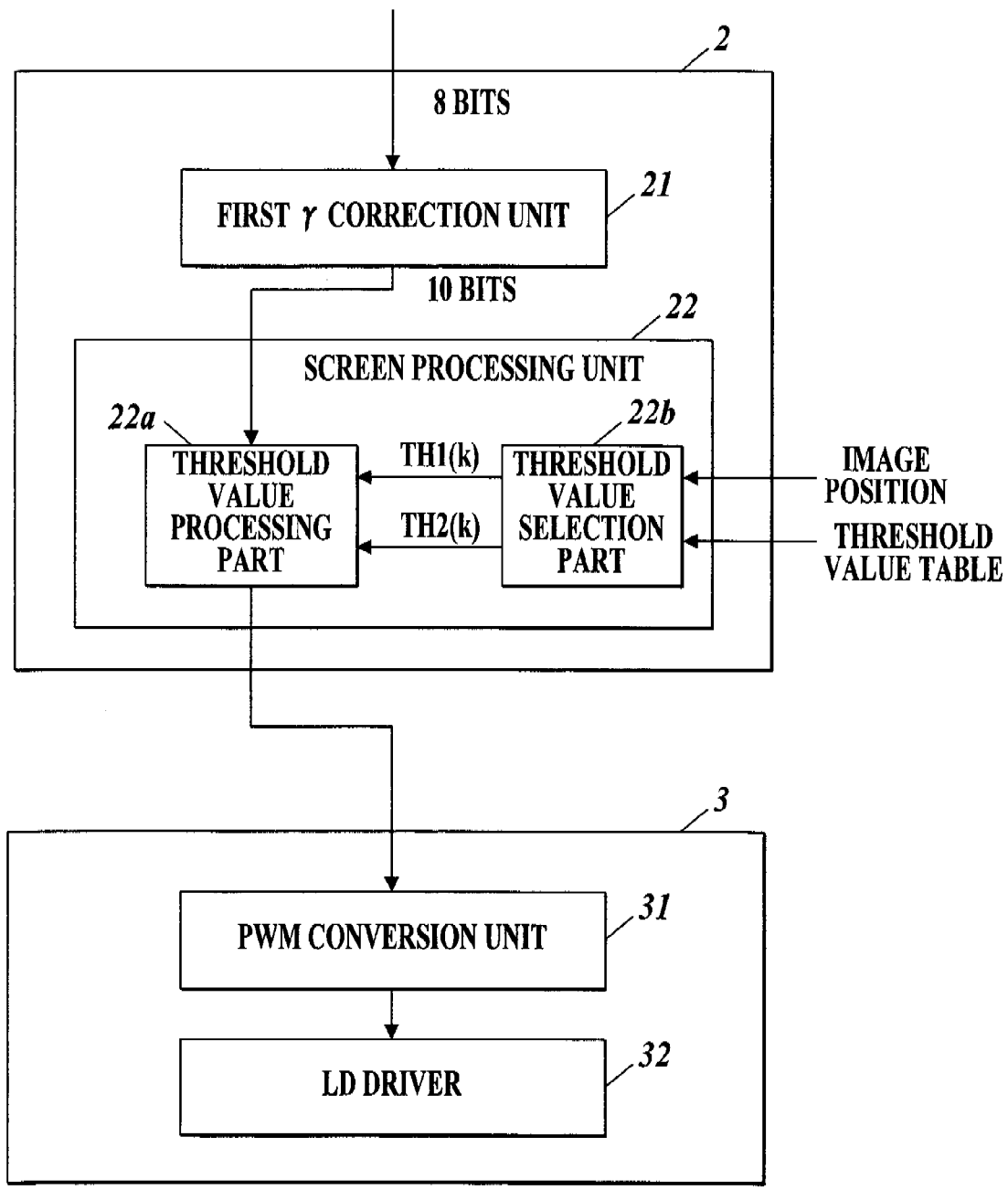
FIG. 2 is a diagram showing a part of a configuration of an image processing section and a printer section.

FIG. 2 shows main configuration parts of the image processing section 2 which function after an image to be printed has been input, and main configuration parts of the printer section 3 which function at the time of exposure. Here, an example in which an image of 8 bits is input to the image processing section 2 is described.

As shown in FIG. 2, the image processing section 2 comprises a first γ correction unit 21, and a screen processing unit 22. The screen processing unit 22 comprises a threshold value processing part 22a, and a threshold value selection part 22b.

The first γ correction unit 21 performs first γ correction processing to change the density of the input image. A look-up table (LUT) which is previously prepared is used for the first γ correction processing. The LUT is determined with the input-output characteristics so that the ratio of the density of the output image after the printing with respect to the density of the original input image (that is to say, the γ value) is to be 1, having the printer characteristics in consideration.

The first γ correction unit 21 converts the number of bits in the image so as to make the output number of bits larger than the input number of bits. For example, the first γ correction unit 21 designs the input-output characteristics of the LUT to be used in the above mentioned first γ correction processing, so that the input number of bits is 8 bits (256 gradations) and the output number of bits is 10 bits (1024 gradations), to enable the bit conversion being performed by the LUT at the same time as the density change.

The screen processing unit 22 performs the screen processing for an image by using a subcell.

Figures 3A, 3B:
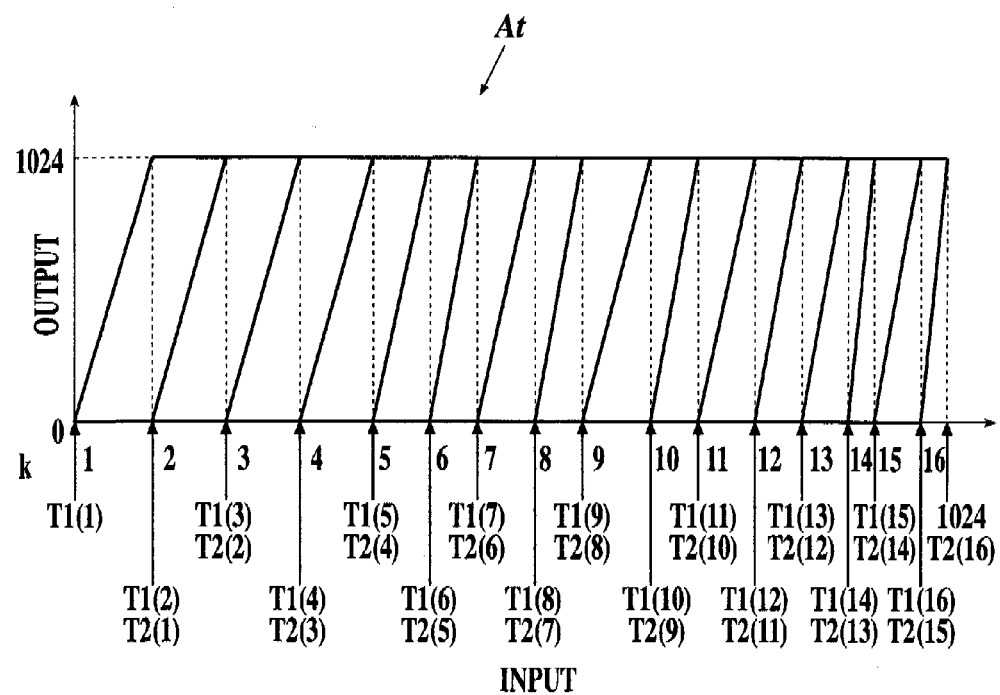
FIG. 3A is a diagram showing a subcell which is normally used.
FIG. 3B is a diagram showing a threshold value table set for the subcell shown in FIG. 3A.

FIG. 3A show an example of a subcell A which is normally used, and FIG. 3B shows an example of a threshold value table At set for the subcell A. The subcell A is a group of m×n number of cells, and one cell corresponds to one pixel. In the threshold value table At, the threshold values are determined according to the position of each cell in the subcell A. Dots are formed for each pixel by the screen processing using the subcell A, thereby a group of dots makes one halftone dot be formed. That is to say, subcell A is a pixel group which configures one halftone dot.

As shown in FIG. 3A, the subcell A is a square subcell comprising a total of 16 cells wherein m=4 and n=4. Each cell is set with the cell number k (k=1, . . . , 16). The numbers in the cells shown in FIG. 3A are respectively the cell number k. The cell number k is set in an order of how much the dot formation is desired. One halftone dot is formed from one subcell by the screen processing, and the subcell A is set with the cell numbers in a spiral form in the order from the cell located in the center of the halftone dot (the first cell) to the cells located around the first cell, so that the halftone dot forms a circle.

Figure 4:
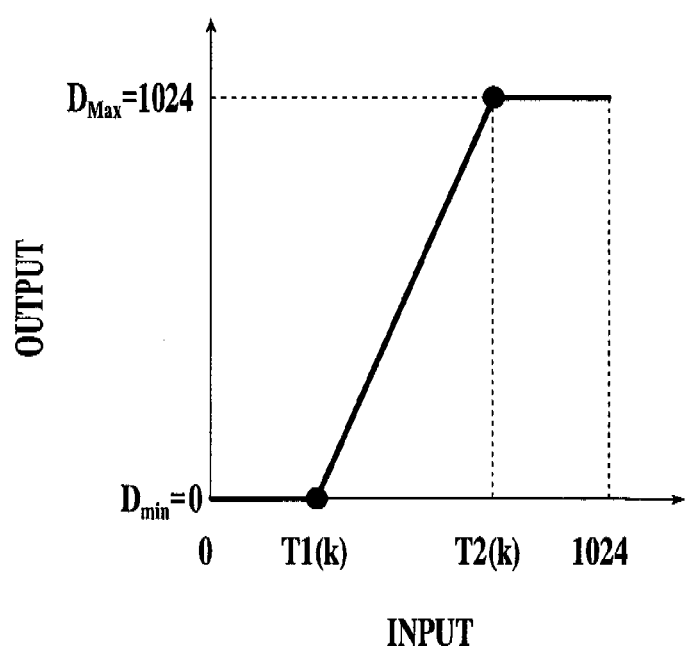
FIG. 4 is a diagram showing a first threshold value and a second threshold value set for the cell number k.

Threshold values of each cell are determined according to the cell number k, in the threshold value table At. A description is given for the threshold value of the focused cell number k. The cell number k is set with the first threshold value $T1(k)$ and the second threshold value $T2(k)$ which satisfy $T1(k)<T2(k)$ as shown in FIG. 4. The two threshold values $T1(k)$ and $T2(k)$ are set to satisfy $T1(k)<T1(k+1)$ and $T2(k)<T2(k+1)$, so that the dots are formed in the order of the cell number k. Further, the two threshold values $T1(k)$ and $T2(k)$ are set so that the first threshold value $T1(k)$ of the cell number k has the same value as the second threshold value $T2(k-1)$ of the cell number $(k-1)$.

The threshold value table At is also a conversion table which indicates the output pixel value for the input pixel value to be output by the screen processing. As shown in FIG. 4, the threshold value table At indicates that: an invariable value $D_{min}$ is output when the input pixel value of a pixel located at the cell number k is smaller than the first threshold value $T1(k)$; an invariable value $D_{Max}$ is output when the input pixel value is larger than the second threshold value $T2(k)$; and an interpolated value between the invariable values $D_{min}$ and $D_{Max}$ is output when the input pixel value is in the range of equal to or more than the first threshold value $T1(k)$, and equal to or less than the second threshold value $T2(k)$, as the output pixel value, respectively. The invariable values $D_{min}$ and $D_{Max}$ may be set arbitrarily, however, $D_{min}$ is set to be the minimum value of 0, and $D_{Max}$ is set to be the maximum value of 1024 for the input image of 10 bits, in the case here.

The interpolated value between the invariable values $D_{Max}$ and $D_{min}$ may be obtained by using an interpolation equation defined by the two threshold values $T1(k)$ and $T2(k)$. The straight lines connecting the two threshold values $T1(k)$ and $T2(k)$ in the threshold value table At indicate the interpolation equation to output the interpolated value. The interpolation equation may be monotonically increasing straight lines as shown in FIG. 3B, or may alternatively be monotonically increasing curved lines which are not shown.

Now, the screen processing which the screen processing unit 22 executes by using the subcell A is described with reference to FIG. 5.

Figure 5:
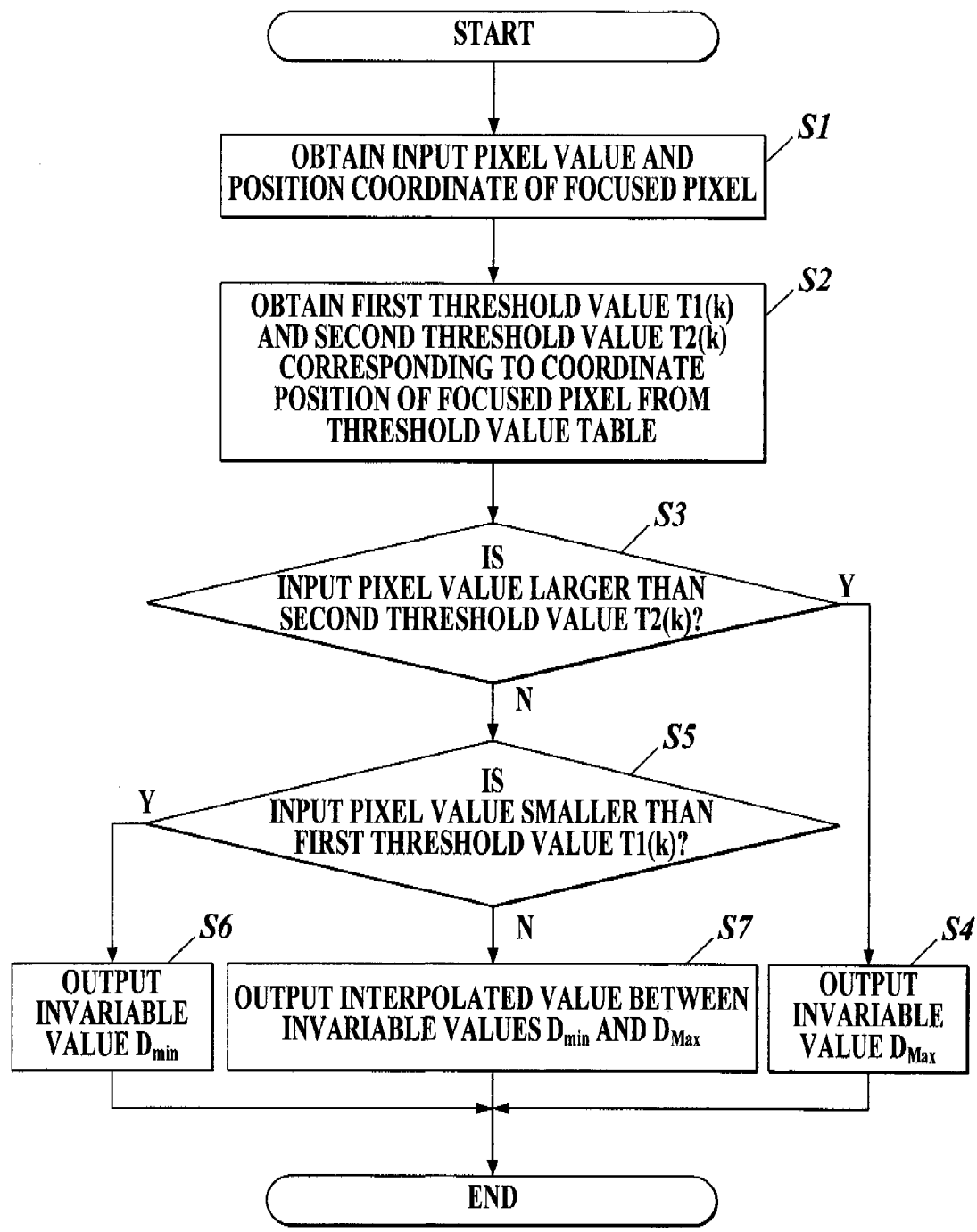
FIG. 5 is a flow chart showing screen processing in which the subcell is used.

As shown in FIG. 5, the screen processing unit 22 scans the input image to obtain the position coordinate and the pixel value of the focused pixel (step S1). The threshold value selection part 22b obtains the threshold values $T1(k)$ and $T2(k)$ corresponding to the obtained coordinate position of the pixel from the threshold value table At of the subcell A (step S2).

The position coordinate of each pixel in an image is indicated as (x,y), and the position coordinate of the cells in the subcell A is indicated as (i,j). The threshold value selection part 22b specifies the cell in the subcell A which corresponds to the focused pixel, from the position coordinate (x,y) of the focused pixel by the following formulae. Incidentally, in the following formulae, a%b indicates that a remainder is obtained by dividing "a" by "b".

i=x%m j=y%n

The threshold value selection part 22b obtains the two threshold values $T1(k)$ and $T2(k)$ corresponding to the cell number k of the specified cell, from the threshold value table At.

For example, the cell corresponding to the pixel having the position coordinate of (3,2) is the cell of number 1 which is located at a position of (i,j)=(3%4,2%4)=(3,2). Accordingly, the first threshold value $T1(1)$ and the second threshold value $T2(1)$ corresponding to the cell of number 1 are obtained from the threshold value table At shown in FIG. 3B.

The obtained first threshold value $T1(k)$ and the second threshold value $T2(k)$ are output to the threshold value processing part 22a.

The threshold value processing part 22a compares the pixel value of the focused pixel (which is referred to as the input pixel value) and the obtained threshold values $T1(k)$ and $T2(k)$, to output the output pixel value corresponding to the input pixel value. That is to say, when the input pixel value is larger than the second threshold value $T2(k)$ (step S3; Y), the invariable value $D_{Max}$=1024 is output as the output pixel value (step S4). When the input pixel value is smaller than the first threshold value $T1(k)$ (step S3; N, step S5; Y), the invariable value $D_{min}$=0 is output as the output pixel value (step S6). When the input pixel value is in the range of equal to or more than the first threshold value $T1(k)$, and equal to or less than the second threshold value $T2(k)$ (step S3; N, step S5; N), the interpolated value between the invariable values $D_{Max}$ and $D_{min}$ is calculated to be output as the output pixel value (step S7).

Figures 6A, 6B:
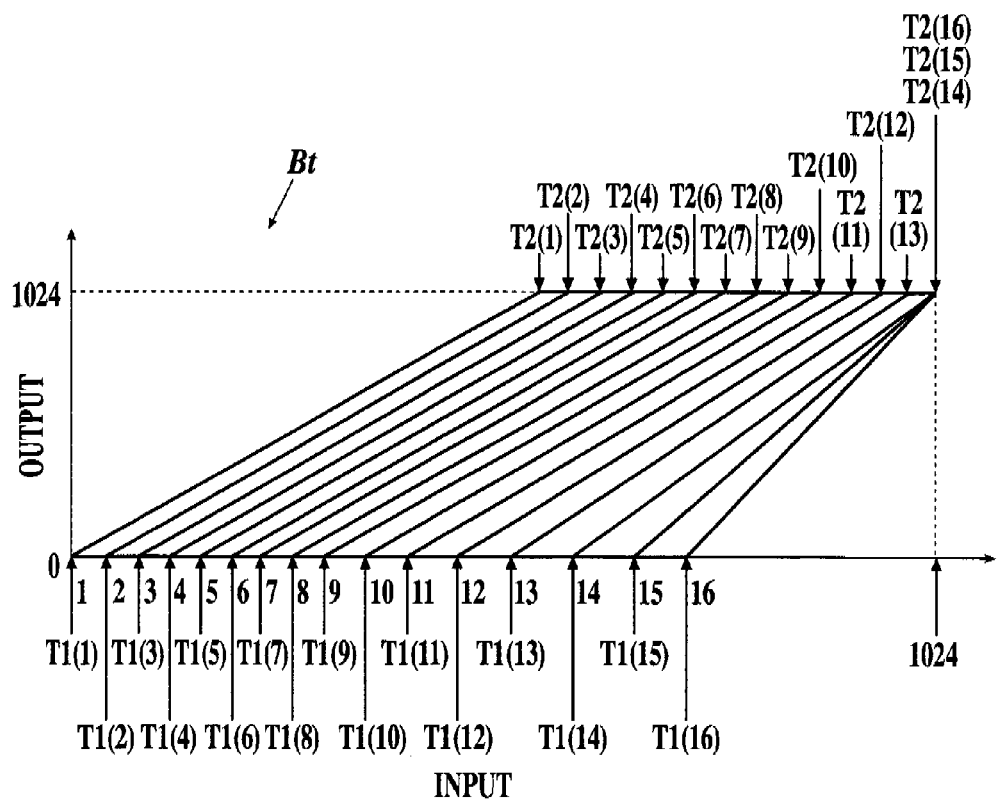
FIG. 6A is a diagram showing an example of the subcell used in a case where a beam spot diameter of a laser light exceeds a controllable size of one pixel.
FIG. 6B is a diagram showing an example of a threshold value table set for the subcell shown in FIG. 6A.

The screen processing unit 22 performs the screen processing normally by using the above described subcell A. However, there may be a case where the beam spot diameter of the laser light used at the time of exposure in the printer section 3, exceeds the size of 1 pixel controllable by the image processing apparatus 1, due to the resolution conversion of an image. In such a case, the screen processing unit 22 performs the screen processing by using a subcell B described in FIG. 6A. The cell configuration and the setting of the cell number k are done in the same manner as in the subcell A, and the screen processing using the subcell B also has the same processing content as the one shown in FIG. 5, however, the threshold value table set for the subcell B is different from that for the subcell A. FIG. 6B shows the threshold value table Bt set for the subcell B.

In the threshold value table Bt, the first threshold value $T1(k)$ for the cell number k is determined so as to be larger than the first threshold value $T1(k-1)$ and to be smaller than the second threshold value $T2(k-1)$, both of which are for the cell of number (k-1) being set to form the dots earlier than the cell number k. For example, in the threshold value table Bt shown in FIG. 6B, the first threshold value $T1(2)$ for the cell number 2 satisfies the relationship of $T1(1)<T1(2)<T2(1)$, with respect to the threshold values for the cell number 1. Thereby, the density of an image where dots are formed for a given pixel, can be designed so that the output pixel value of a pixel (which is referred to as a prior pixel) which is determined to form dots prior to the given pixel does not reach the maximum value.

Incidentally, it is preferable that there are at least three or more cells in a single subcell B, where the first threshold value $T1(k)$ for the cell number k is larger than the first threshold value $T1(k-1)$ and is smaller than the second threshold value $T2(k-1)$, both of which are for the cell of number (k-1) being set to form the dots prior to the cell number k.

Figure 7A:
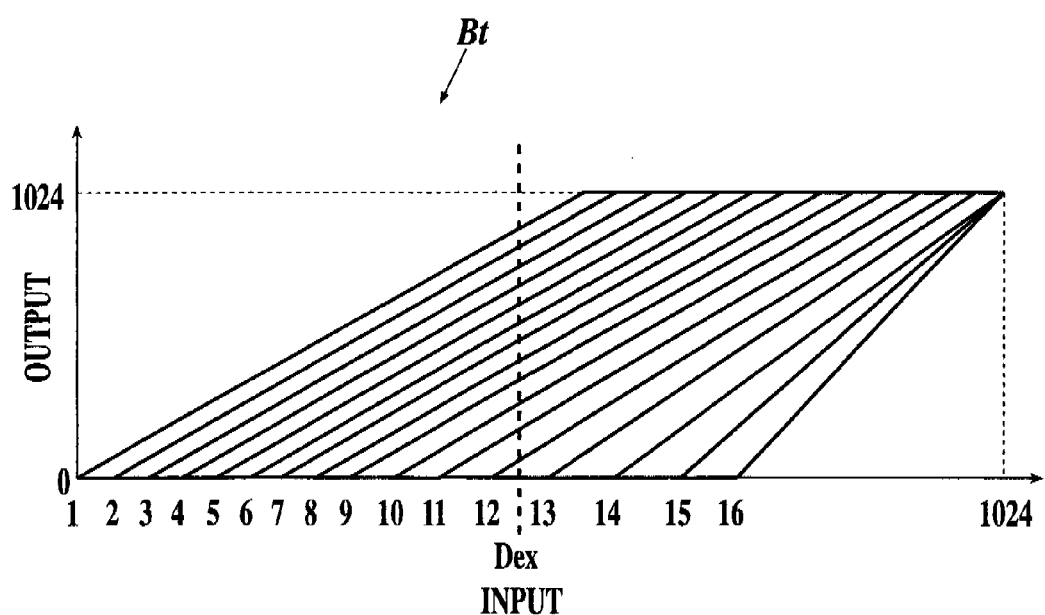
FIG. 7A is a diagram showing a relationship between the threshold value table used in the case where the beam spot diameter of the laser light exceeds the controllable size of one pixel, and an input pixel value $D_{ex}$.
Figure 7B:
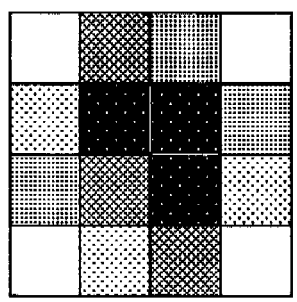
FIG. 7B is a diagram showing a result of the screen processing in which the threshold value table shown in FIG. 7A is used.

For example, in a case where the screen processing using the subcell B is performed for an image region having a pixel value $D_{ex}$ of 4×4 pixels, the input pixel value $D_{ex}$ is smaller than the threshold value $T1(13)$ for the cell number 13 as shown in FIG. 7A, thus dots are formed only for the cell numbers 1-12. In this case, the dots are formed for the second pixel, however, the output pixel value of the prior pixel of number 1 which is determined to form the dots prior to the cell number 2 has not yet reached the maximum value 1024. The same may be said for the pixels having the cell numbers adjacent to each other, such as the second pixel and the third pixel, the third pixel and the fourth pixel, and the like. The image shown in FIG. 7B can be obtained as a result of the screen processing. In this image, there is no pixel in which the output pixel value has reached the maximum value where the dots are formed, and the output pixel value of the entire pixels of the cell numbers 1-12 is a halftone.

Figure 8A:
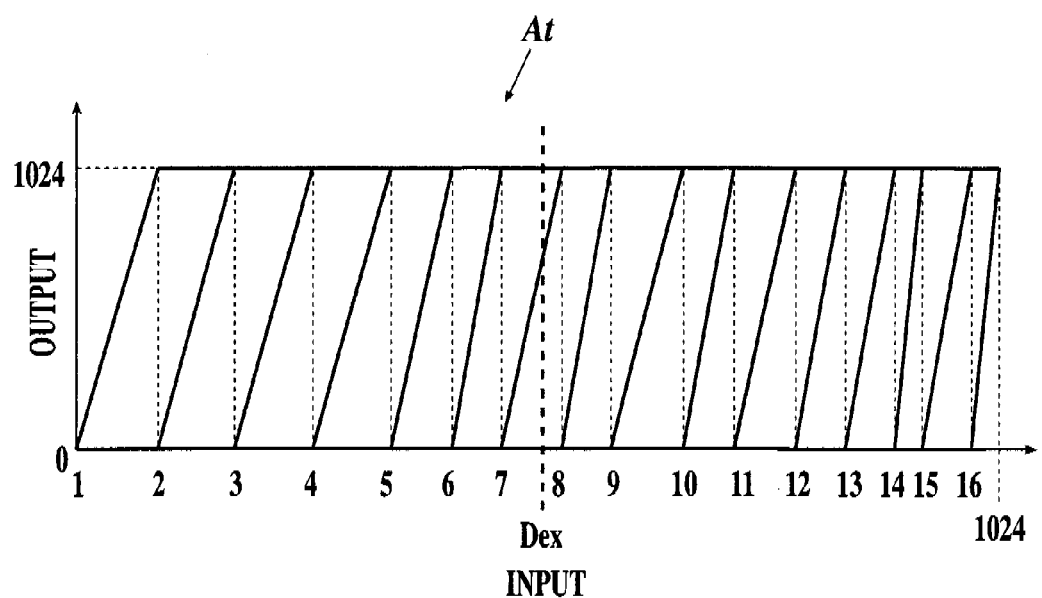
FIG. 8A is a diagram showing a relationship between the threshold value table which is normally used, and the input pixel value $D_{ex}$.
Figure 8B:
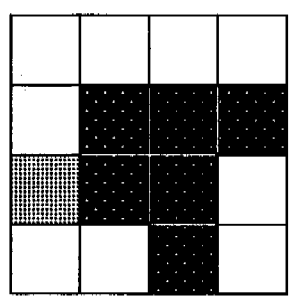
FIG. 8B is a diagram showing a result of the screen processing in which the threshold value table shown in FIG. 8A is used.

In a case where the normal subcell A is used for the same image region, the input pixel value $D_{ex}$ is smaller than the first threshold value $T1(8)$ for the cell number 8 as shown in FIG. 8A, thus the dots are formed for the pixels of the cell numbers 1-7. The first threshold value $T1(k)$ for the cell number k has the same value as the second threshold value $T2(k-1)$ for the cell number (k−1) in the threshold value table At, thus the output pixel value of the first to the sixth pixels reaches the maximum value among the first to the seventh pixel in which the dots are formed. In the image which has been performed with the screen processing, the output pixel value reaches the maximum value in the entire first to the sixth pixels, and only the seventh is a halftone, as shown in FIG. 8B.

When there are many pixels which have reached the maximum value as in the case where the subcell A is used, the light amount of the laser light at the time of exposure is increased, and the latent image formed by the laser light is to have an energy distribution with a broad base as shown in FIG. 9, thereby the dot gain is to be generated. As a result, the density which is expressed by the halftone dots formed by the subcell A is to be increased compared to the density of the original image, thus the reproduction property of the image is to be degraded.

On the other hand, the pixels which reach the maximum value are substituted to the pixels of the halftone for as many pixels as possible by the threshold value table Bt of the subcell B, thereby the laser light to be output is reduced so as to prevent the size of the dots to be formed from expanding, as shown in FIG. 9. Thus, even in a case in which the beam spot diameter exceeds the controllable size of one pixel, the expansion of the energy distribution in the latent image is reduced as much as possible, thus the dot gain can also be reduced. By the reduction of the dot gain, the halftone dots may not be too large, thus the gradation of the original image can be reproduced.

As described above, the threshold value table Bt basically has the same configuration as the threshold value table At, except that the first threshold value $T1(k)$ for the cell number k is designed to satisfy the relationship of $T1(k-1)<T1(k)<T2(k-1)$, with respect to the threshold values $T1(k-1)$ and $T2(k-1)$ for the prior pixel. For example, the two threshold values $T1(k)$ and $T2(k)$ satisfy $T1(k)<T1(k+1)$ and $T2(k)<T2(k+1)$. Further, the interpolation equation to output the interpolated value of the invariable values $D_{Max}$ and $D_{min}$ may be expressed by a monotonically increasing straight line or a curved line.

Figures 10A, 10B:
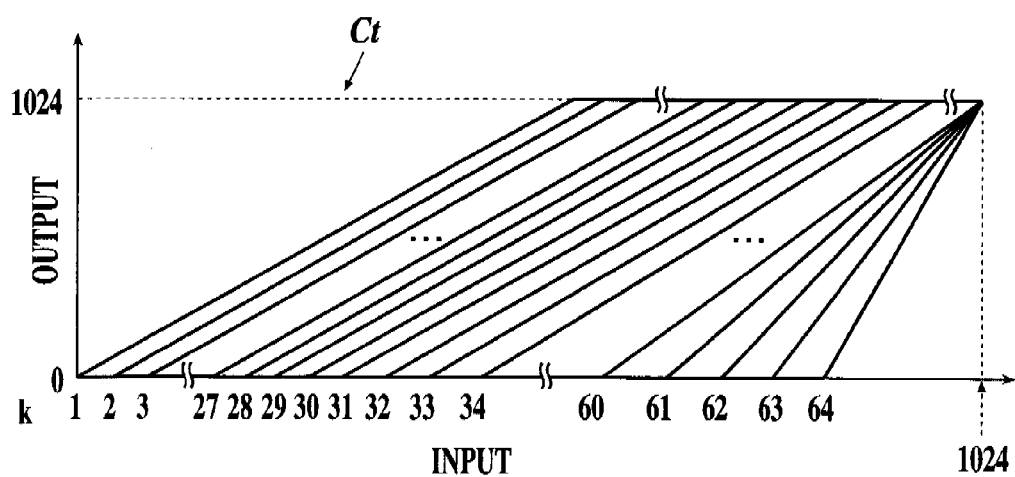
FIG. 10A is a diagram showing an example of a supercell in which four subcells are in combination.
FIG. 10B is a diagram showing an example of a threshold value table set for the supercell shown in FIG. 10A.

In a case where the beam spot diameter of the laser light exceeds the size of one pixel in an image with high resolution, and the halftone dots are formed by the supercell method, a supercell C may for example be used as shown in FIG. 10A, in which four subcells C1-C4 are in combination. In the four subcells C1-C4, the cell numbers k are allotted so that the dots are to be formed from the center to the surroundings in each of the subcells C1-C4, in the order of the subcells C1, C2, C3, and C4. The numbers shown in the cells in FIG. 10A indicate the cell numbers k.

FIG. 10B shows a threshold value table Ct set for the supercell C. The setting method of the threshold values $T1(k)$ and $T2(k)$ in the threshold value table Ct is the same as the threshold value table Bt, except that the number of cells in which the threshold values $T1(k)$ and $T2(k)$ are set is increased to 16×4 for the number of cells in the supercell C. Further, the method of the screen processing where the supercell C is used is performed in the same manner as in the processing content described by FIG. 5, thereby the description thereof is omitted here.

Also in the case where the supercell method is applied, the prior pixel of the cell number (k−1) does not reach the maximum value even in the condition of the image density when the dots are formed for the pixel of the cell number k, by the threshold value table Ct. Accordingly, the number of pixels which reach the maximum value can be reduced in the same manner as in the case where the single subcell B is used.

Figure 11A:
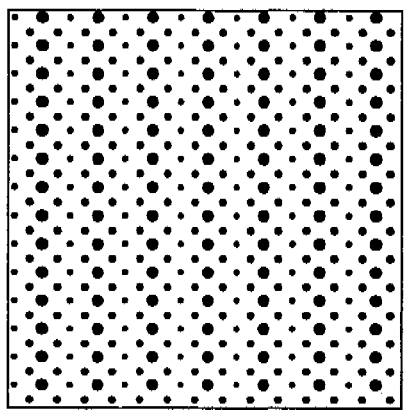
FIG. 11A is a diagram showing a result of the screen processing performed by the supercell in which the threshold value is set in the same manner as in the threshold value table shown in FIG. 3A.
Figure 11B:
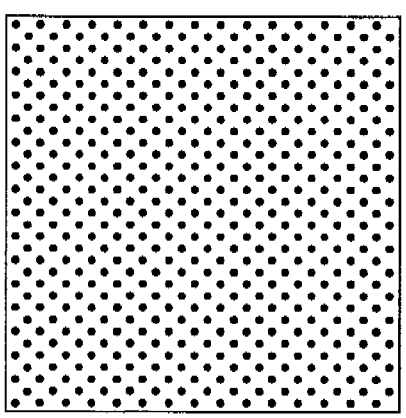
FIG. 11B is a diagram showing a result of the screen processing performed by the supercell in which the threshold value table shown in FIG. 10B is set.

When the same method as in the threshold value table At shown in FIG. 3A is applied for the supercell C, as the setting method of the threshold values, the threshold values of each cell satisfy $T1(k)=T2(k-1)$. Thus, the pixels reach the maximum value in the order from the first pixel to generate the dot gain, thereby the size of the halftone dots is likely to be larger in the order of the subcells C1, C2, C3 and C4. The size of the halftone dots are different in each of the subcells C1-C4, thus the image having been subjected to the screen processing gives the impression of having an uneven granularity as shown in FIG. 11A.

On the other hand, in the case where the threshold value table Ct is used, many dots of halftone are formed in each of the subcells C1-C4, thus the dot gain can be reduced. As a result, the difference in the size of the halftone dots formed by each of the subcells C1-C4 is small, thus the granularity can be improved.

As described above, in the case where the dots are formed by the supercell method, when the number of subcells used in the supercell is expressed as z (where z is an integer number which satisfies z>1), the number of the pixels which satisfy the following relationship may be at least z−1 pixels among the pixels in the subcells, wherein the relationship is that the first threshold value $T1(k)$ for the pixel number k is larger than the first threshold value $T1(k-1)$ and smaller than the second threshold value $T2(k-1)$ for the prior pixel of number k−1, which is determined to form the dots prior to the pixel of number k. When there are not less than z−1 pixels, the halftone dots formed in each of the subcells in the supercell can be prevented from having different sizes, so as to improve the granularity.

Further, also in the supercell C, there are preferably at least three or more cells in one subcell B, in which the first threshold value $T1(k)$ for the pixel number k is larger than the first threshold value $T1(k-1)$ and smaller than the second threshold value $T2(k-1)$ for the cell of number k−1, which is determined to form the dots prior to the cell of number k.

The image which has been subjected to the screen processing as described above is output to the printer section 3.

As shown in FIG. 2, the printer section 3 comprises the PWM conversion unit 31 and the laser driver (LD) 32.

The PWM conversion unit 31 converts the image signal of an image input from the screen processing unit 22 to a PWM signal. The LUT which has been prepared in advance is used for the conversion. The PWM signal (%) to be output for the input image signal is determined in the LUT.

The PWM conversion unit 31 performs second γ correction processing to reduce the pixel value in a high density region of the input image at the same time as the conversion of the image signal to the PWM signal.

Figure 12:
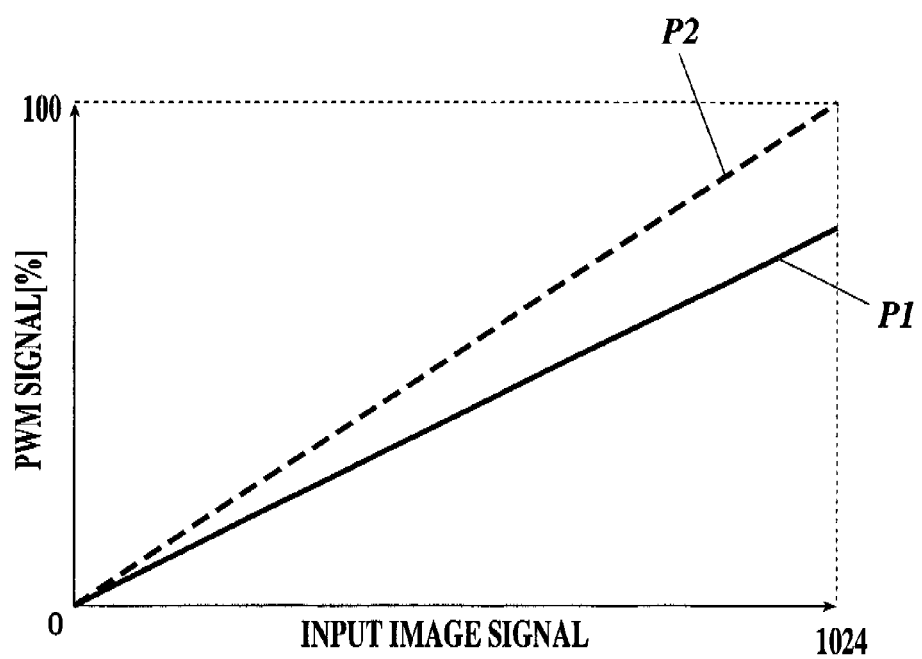
FIG. 12 is a diagram showing input-output characteristics of a look-up table (LUT) used in a second γ correction processing.

FIG. 12 is a diagram showing input-output characteristics of the LUT used in the second γ correction processing. Normally, as shown as the characteristics curve line P2 in FIG. 12, the PWM conversion is performed by using the LUT having the input-output characteristics so that the ratio of the output PWM signal to the input image signal may be 1. However, in a case where the beam spot diameter of the laser light is smaller than the controllable size of one pixel, the PWM conversion unit 31 uses the LUT in which the input-output characteristics are determined so that the pixel value located in the high density region of the input image is reduced, as shown as the characteristics curve line P1 in FIG. 12. The LUT according to the characteristics curve line P1 is designed so that the output value of the PWM signal in the vicinity of the high density region is to be reduced. The PWM signal value in the high density region (the density region in the vicinity of the maximum value 1024) where the dot gain is likely to be generated is made to be small, thereby the light amount of the laser light is reduced as much as possible, and the dot gain is intended to be reduced.

The LD driver 32 drives the laser light source based on the PWM signal input from the PWM conversion unit 31, so as to emit the laser light.

As described above, according to the present embodiment, in the case where the beam spot diameter of the laser light exceeds the controllable size of one pixel, the screen processing unit 22 performs the screen processing by using the subcells which are determined so that the first threshold value T1(k) of a given pixel in the subcell is larger than the first threshold value T1(k−1) and is smaller than the second threshold value T2(k−1) of the prior pixel for which the first threshold value and the second threshold values are determined so as to form the dots prior to the given pixel. Thereby, the pixels in which the output pixel value reaches the maximum value can be reduced and the dot gain can also be reduced. The reduction of the dot gain can prevent the gradation collapse, and can improve the reproduction property of an original image.

Further, the first γ correction unit 21 converts the number of bits in an image so that the number of output bits may be larger than the number of input bits, before the screen processing. Thus, the gradation of the image which is subjected to the screen processing can be expanded, and the reproduction property of the gradation of the original image may be further improved.

Further, the PWM conversion unit 31 converts the pixel value of an image so as to reduce the pixel value of pixels located in the high density region, when converting the image signal to the PWM signal. The pixel value of the high density region where the maximum value is likely to be reached is reduced, thereby the dot gain can be further reduced.

Incidentally, the above described embodiment is a preferred example, and the present invention is not limited to this.

In the above described embodiment, an example in which the threshold value tables Bt, Ct are used in the case where the beam spot diameter of the laser light exceeds the controllable size of one pixel, has been explained. However, even in a case where the beam spot diameter is not more than the controllable size of one pixel, when the output power of the laser light is large, and thus when the light amount which is to be obtained as a result is substantially the same as in the case where the beam spot diameter of the laser light exceeds the controllable size of one pixel, there still is a possibility that the dot gain may be generated. Accordingly, the screen processing by the subcell B in which the threshold value table Bt is set may be performed also in such a case.

Figure 13:
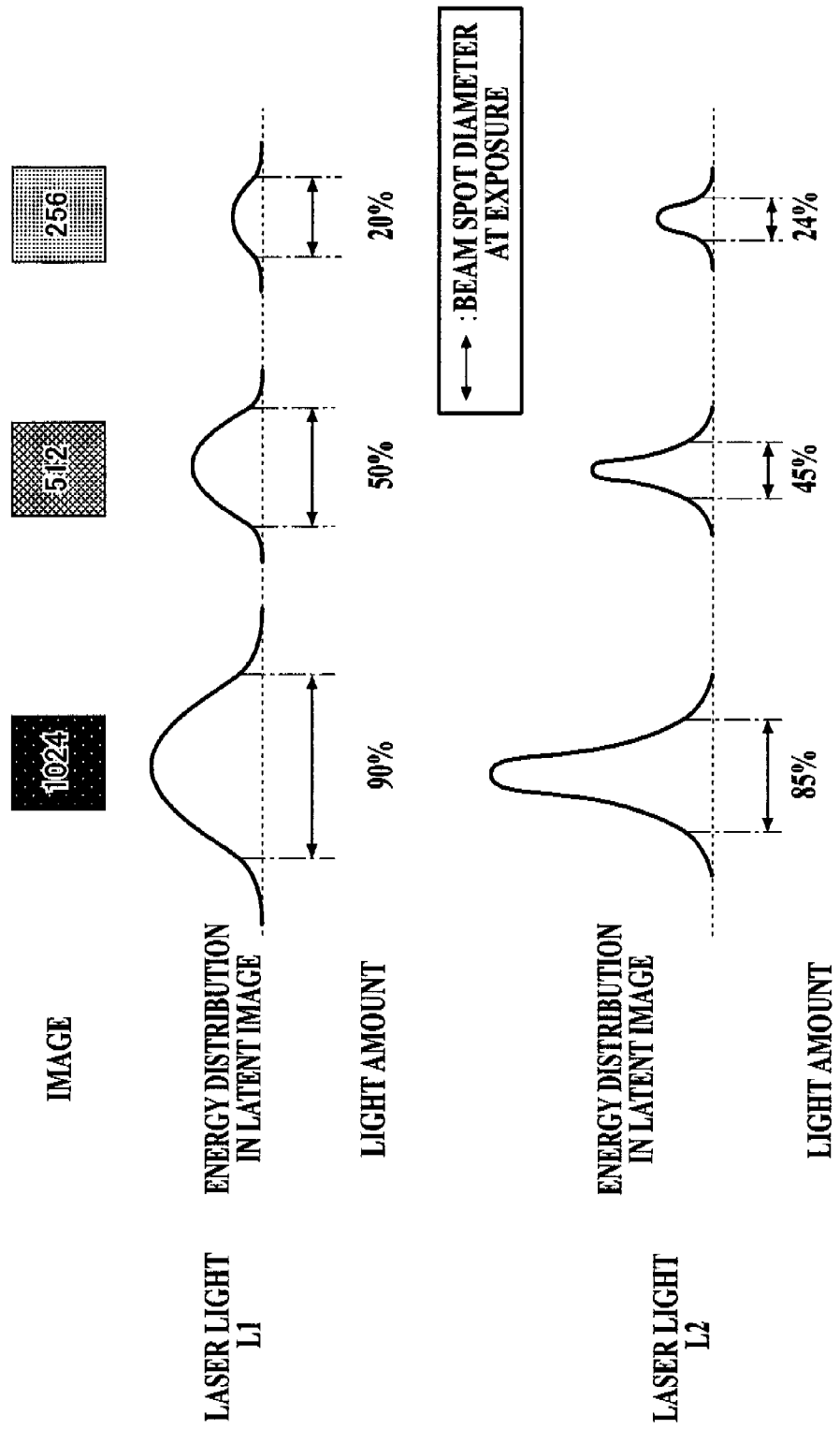
FIG. 13 is a diagram in which the energy distributions in the latent image formed by the laser light L1 in which the beam spot diameter thereof exceeds the controllable size of one pixel, and by a laser light L2 in which the beam spot diameter thereof is not larger than the controllable size of one pixel, but the exposure amount thereof is substantially the same as that of the laser light L1, are compared.
Figure 14:
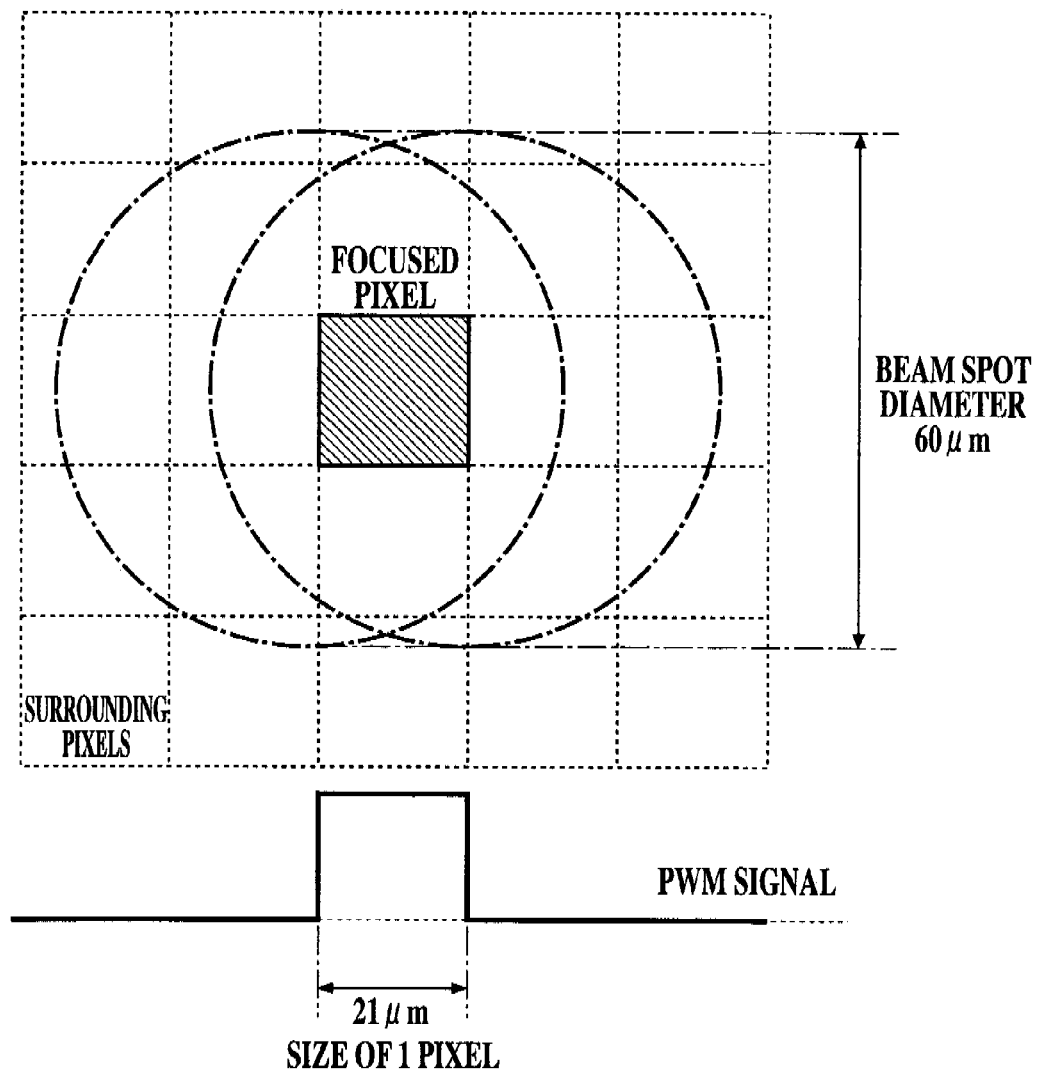
FIG. 14 is a diagram showing a relationship between the beam spot diameter of the laser light and the size of one pixel.
Figure 15:
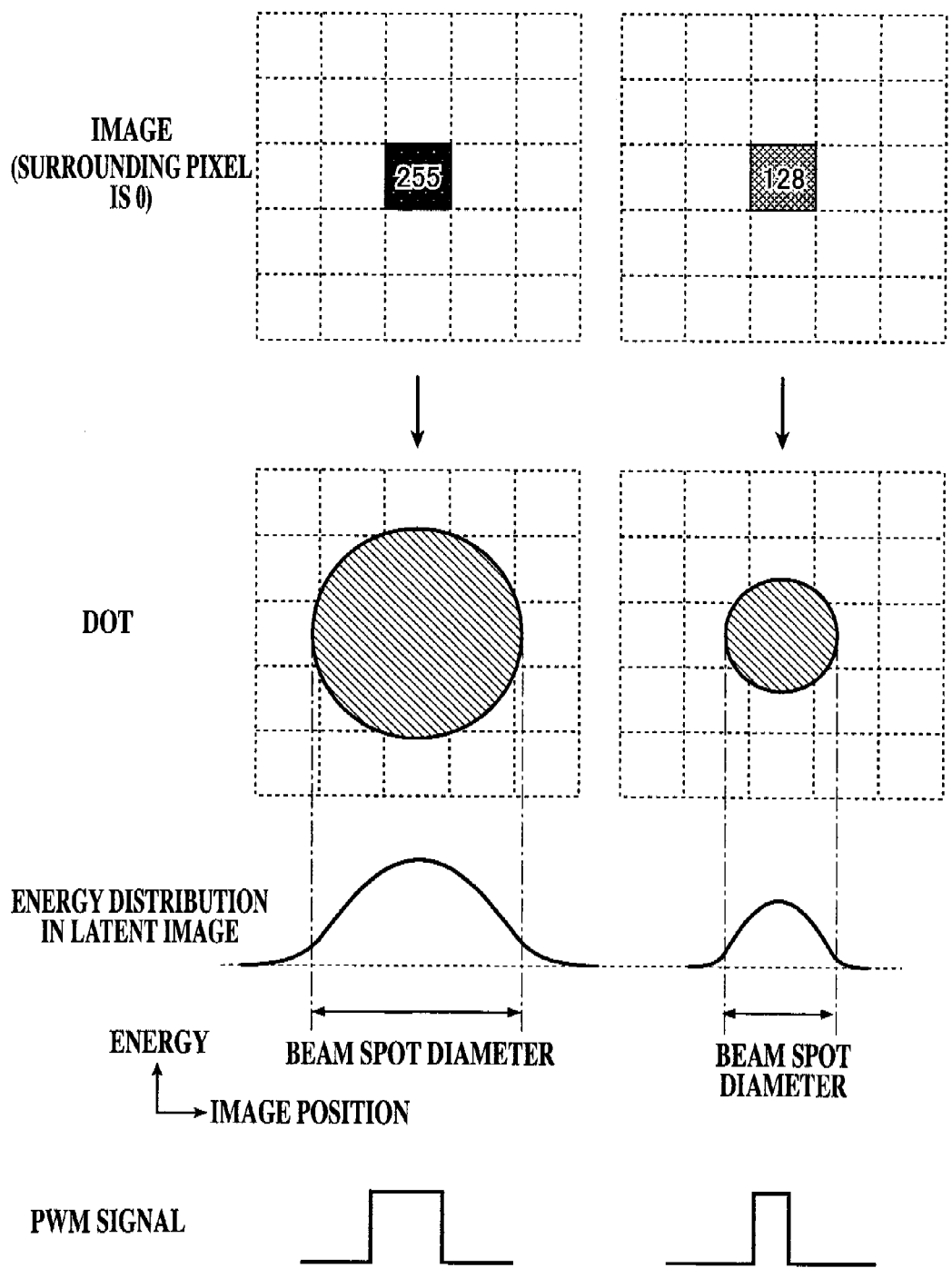
FIG. 15 is a diagram describing a dot gain.

FIG. 13 is a diagram in which the energy distributions in the latent image formed by the laser light L1 in which the beam spot diameter thereof exceeds the controllable size of one pixel, and by a laser light L2 in which the beam spot diameter thereof is not larger than the controllable size of one pixel, are compared. The exposed light amount of the laser light L1 is 90%, 50%, 20% with respect to the pixel values of 1024, 512, 256 (gradation of 0-1024), respectively. As for the laser light L2, the beam spot diameter thereof is small, however, the output power thereof is large, thus the exposed light amount of the laser light L2 is 85%, 45%, 24%, respectively, which is substantially the same as the exposed light amount of the laser light L1. In this case, the energy distribution in the latent image is to have a broad base as shown in FIG. 13 in the laser light L2, and the light is exposed in a state of exceeding the size of one pixel at the time of the maximum value of 1024. Further, in the case of the pixel value having a halftone of 512 and 256, the size of one pixel has not been exceeded, however, the exposed light amount is to be larger than the exposed light amount which is supposed to be output for the pixel value of the original image, thereby resulting in lack of reproduction property. Accordingly, also in this case, the screen processing is performed by using the subcell B in which the threshold value table Bt is set, thereby the dot gain can be reduced by a simple configuration.

Further, in the above described embodiment, an example in which the second γ correction processing to reduce the pixel value in the high density region is performed by the PWM conversion unit 31 has been explained. Alternatively, the image processing section 2 may comprise a second γ correction unit, and the second γ correction processing may be executed for the image output from the screen processing unit 22 by the second γ correction unit. In the PWM conversion unit 31, the image signal of an image which has been subjected to the second γ correction processing may be converted to the PWM signal by using the LUT indicated as the characteristics curve line P2 shown in FIG. 12. Thereby, the design of the PWM conversion unit 31 need not be changed. The second γ correction processing may be performed prior to the screen processing.

Further, the screen processing using the above described subcell B or the supercell C may be programmed so that the screen processing may be realized by software processing of this program in cooperation with a hardware such as the CPU, and the like. As the computer-readable media of such a program, a nonvolatile memory, such as the ROM, a flash memory, and the like; and a portable recording media, such as a compact disc read only memory (CD-ROM), and the like, can be applied.

Moreover, as a medium to provide the data of a program through a communication line, a carrier wave may also be applied.

According to an aspect of the preferred embodiment of the present invention, there is provided an image processing apparatus to perform screen processing for image data, and to form an image based on the image data which has been performed with the screen processing, comprising a screen processing unit to perform the screen processing by using a subcell which corresponds to a plurality of pixels, and in which a first threshold value and a second threshold value are determined according to each position of the pixels, so as to satisfy a relationship of the first threshold value<the second threshold value, wherein the screen processing unit obtains the first threshold value and the second threshold value from the subcell, which correspond to the position of each pixel in an image, to output: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is determined so that the first threshold value of a given pixel in the subcell is larger than the first threshold value of a prior pixel and is smaller than the second threshold value of the prior pixel, the first threshold value and the second threshold value of the prior pixel being determined so that a dot is formed in the prior pixel earlier than in the given pixel.

According to another aspect of the preferred embodiment of the present invention, there is provided an image forming method in an image processing apparatus to perform screen processing for image data, and to form an image based on the image data which has been performed with the screen processing, comprising performing the screen processing by using a subcell which corresponds to a plurality of pixels, and in which a first threshold value and a second threshold value are determined according to each position of the pixels, so as to satisfy a relationship of the first threshold value<the second threshold value, wherein the performing of the screen processing comprises:

obtaining the first threshold value and the second threshold value from the subcell, which correspond to the position of each pixel in an image; and outputting: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is determined so that the first threshold value of a given pixel in the subcell is larger than the first threshold value of a prior pixel and is smaller than the second threshold value of the prior pixel, the first threshold value and the second threshold value of the prior pixel being determined so that a dot is formed in the prior pixel earlier than in the given pixel.

According to the image processing apparatus and the image processing method, the dot gain can be reduced. Further, the reduction of the dot gain may improve the reproduction property of the gradation at the time of screen processing.

Preferably, in a case where a beam spot diameter of a laser light which is used at a time of an exposure exceeds a controllable size of one pixel, the screen processing unit performs the screen processing in which the subcell is used.

Preferably, in a case where a beam spot diameter of a laser light which is used at a time of an exposure is not more than a controllable size of one pixel, and an exposed light amount of the laser light is substantially the same as the exposed light amount in a case where the beam spot diameter exceeds the controllable size of one pixel, the screen processing unit performs the screen processing in which the subcell is used.

Preferably, the screen processing unit performs the screen processing by using a supercell in which z number of subcells are in combination, wherein z satisfies z>1, and wherein at least z−1 number of pixels among the supercell, are determined so that the first threshold value of any one of the at least z−1 number of pixels is larger than the first threshold value of the prior pixel and is smaller than the second threshold value of the prior pixel, the first threshold value and the second threshold value of the prior pixel being determined so that a dot is formed in the prior pixel earlier than in the any one of the at least z−1 number of pixels.

Preferably, at least 3 pixels among the subcell, are determined so that the first threshold value of any one of the at least 3 pixels is larger than the first threshold value of the prior pixel and is smaller than the second threshold value of the prior pixel, the first threshold value and the second threshold value of the prior pixel being determined so that a dot is formed in the prior pixel earlier than in the any one of the at least 3 pixels.

Preferably, an interpolation equation to output the interpolation value of the invariable value $D_{Max}$ and the invariable value $D_{min}$ is expressed either by a monotonically increasing straight line or by a monotonically increasing curved line.

Preferably, a first γ correction unit is comprised to convert the number of bits in the image so that an output number of bits is to be larger than an input number of bits, before the screen processing.

Preferably, a second γ correction unit is comprised to convert the pixel value of the image so that the pixel value of the pixels located in a high density region is reduced, after the screen processing.

The present U.S. patent application claims a priority under the Paris Convention of Japanese patent application No. 2009-069773 filed on Mar. 23, 2009, which shall be a basis of correction of an incorrect translation.

What is claimed is:

1. An image processing apparatus to perform screen processing for image data, and to form an image based on the image data which has been performed with the screen processing, comprising a screen processing unit to perform the screen processing by using a subcell which corresponds to a plurality of pixels, and in which a first threshold value and a second threshold value are determined according to each position of the pixels, so as to satisfy a relationship of the first threshold value<the second threshold value in a case where a beam spot diameter of a laser light which is used at a time of an exposure exceeds a controllable size of one pixel, wherein the screen processing unit obtains the first threshold value and the second threshold value from the subcell, which correspond to the position of each pixel in an image, to output: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is a pixel group which configures one halftone dot, and a pixel among the subcell is determined so that the first threshold value of the pixel is larger than the first threshold value of at least 2 prior pixels among the subcell and is smaller than the second threshold value of each of at least 3 prior pixels for a whole range of the pixel value.

2. An image processing apparatus to perform screen processing for image data, and to form an image based on the image data which has been performed with the screen processing, comprising a screen processing unit to perform the screen processing by using a subcell which corresponds to a plurality of pixels, and in which a first threshold value and a second threshold value are determined according to each position of the pixels, so as to satisfy a relationship of the first threshold value<the second threshold value in a case where a beam spot diameter of a laser light which is used at a time of an exposure is not more than a controllable size of one pixel, and an exposed light amount of the laser light is substantially the same as the exposed light amount in a case where the beam spot diameter exceeds the controllable size of one pixel wherein the screen processing unit obtains the first threshold value and the second threshold value from the subcell, which correspond to the position of each pixel in an image, to output: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is a pixel group which configures one halftone dot, and a pixel among the subcell is determined so that the first threshold value of the pixel is larger than the first threshold value of at least 2 prior pixels among the subcell and is smaller than the second threshold value of each of at least 3 prior pixels for a whole range of the pixel value.

3. The image processing apparatus as claimed in claim 1, wherein an interpolation equation to output the interpolation value of the invariable value $D_{Max}$ and the invariable value $D_{min}$ is expressed either by a monotonically increasing straight line or by a monotonically increasing curved line.

4. The image processing apparatus as claimed in claim 1, further comprising a first gamma correction unit to convert the number of bits in the image so that an output number of bits is to be larger than an input number of bits, before the screen processing.

5. The image processing apparatus as claimed in claim 1, further comprising a second gamma correction unit to convert the pixel value of the image so that the pixel value of the pixels located in a high density region is reduced, after the screen processing.

6. An image forming method in an image processing apparatus to perform screen processing for image data, and to form an image based on the image data which has been performed with the screen processing, comprising performing the screen processing by using a subcell which corresponds to a plurality of pixels, and in which a first threshold value and a second threshold value are determined according to each position of the pixels, so as to satisfy a relationship of the first threshold value<the second threshold value in a case where a beam spot diameter of a laser light which is used at a time of an exposure exceeds a controllable size of one pixel wherein the performing of the screen processing comprises:
obtaining the first threshold value and the second threshold value from the subcell, which correspond to the position of each pixel in an image;

and outputting: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is a pixel group which configures one halftone dot, and a pixel among the subcell is determined so that the first threshold value of the pixel is larger than the first threshold value of at least 2 prior pixels among the subcell and is smaller than the second threshold value of each of at least 3 prior pixels for a whole range of the pixel value.

7. An image forming method in an image processing apparatus to perform screen processing for image data, and to form an image based on the image data which has been performed with the screen processing, comprising performing the screen processing by using a subcell which corresponds to a plurality of pixels, and in which a first threshold value and a second threshold value are determined according to each position of the pixels, so as to satisfy a relationship of the first threshold value<the second threshold value in a case where a beam spot diameter of a laser light which is used at a time of an exposure is not more than a controllable size of one pixel, and an exposed light amount of the laser light is substantially the same as the exposed light amount in a case where the beam spot diameter exceeds the controllable size of one pixel wherein the performing of the screen processing comprises:
obtaining the first threshold value and the second threshold value from the subcell, which correspond to the position of each pixel in an image;

and outputting: an invariable value $D_{min}$ when a pixel value is smaller than the first threshold value; an invariable value $D_{Max}$ when the pixel value is larger than the second threshold value; and an interpolated value of the two invariable values $D_{min}$ and $D_{Max}$ when the pixel value is equal to or more than the first threshold value, and is equal to or less than the second threshold value, and wherein the subcell is a pixel group which configures one halftone dot, and a pixel among the subcell is determined so that the first threshold value of the pixel is larger than the first threshold value of at least 2 prior pixels among the subcell and is smaller than the second threshold value of each of at least 3 prior pixels for a whole range of the pixel value.

8. The image processing method as claimed in claim 6, wherein an interpolation equation to output the interpolation value of the invariable value $D_{Max}$ and the invariable value $D_{min}$ is expressed either by a monotonically increasing straight line or by a monotonically increasing curved line.

9. The image processing method as claimed in claim 6, further comprising performing a first gamma correction to convert the number of bits in the image so that an output number of bits is to be larger than an input number of bits, before the screen processing.

10. The image processing method as claimed in claim 6, further comprising performing a second gamma correction to convert the pixel value of the image so that the pixel value of the pixels located in a high density region is reduced, after the screen processing.

* * * * *